(12) United States Patent (10) Patent No.: US 12,572,523 B2
Huang et al. (45) Date of Patent: Mar. 10, 2026

(54) METHOD AND APPARATUS FOR DATA QUERY

(71) Applicant: Beijing Volcano Engine Technology Co., Ltd., Beijing (CN)

(72) Inventors: Zhaowei Huang, Beijing (CN); Leilei Hu, Beijing (CN); Yuanpu Ding, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/827,194

(22) Filed: Sep. 6, 2024

(65) Prior Publication Data

US 2025/0139074 A1 May 1, 2025

(30) Foreign Application Priority Data

Oct. 26, 2023 (CN) .......................... 202311404208.5

(51) Int. Cl.
 G06F 16/22 (2019.01)
 G06F 16/21 (2019.01)
(52) U.S. Cl.
 CPC ........ G06F 16/2272 (2019.01); G06F 16/219 (2019.01); G06F 16/221 (2019.01)
(58) Field of Classification Search
 CPC .. G06F 16/2272; G06F 16/219; G06F 16/221; G06F 16/2228
 See application file for complete search history.

(56) References Cited

U.S. PATENT DOCUMENTS

| | | | | |
|---|---|---|---|---|
| 2013/0304723 | A1* | 11/2013 | Konik | G06F 16/24542 |
| | | | | 707/718 |
| 2018/0096006 | A1* | 4/2018 | Das | G06F 16/221 |
| 2021/0117232 | A1 | 4/2021 | Sriharsha et al. | |
| 2021/0286806 | A1* | 9/2021 | Ahmadi | G06F 16/245 |
| 2022/0284024 | A1* | 9/2022 | Tasker | G06F 16/27 |

(Continued)

FOREIGN PATENT DOCUMENTS

| | | |
|---|---|---|
| CN | 101727465 A | 6/2010 |
| CN | 104424287 A | 3/2015 |

(Continued)

OTHER PUBLICATIONS

China National Intellectual Property Administration, Search Report Issued in Application No. 2023114042085, Dec. 8, 2025, 2 pages.

*Primary Examiner* — Merilyn P Nguyen
(74) *Attorney, Agent, or Firm* — Alleman Hall LLP

(57) ABSTRACT

The present application discloses a data query method. The method can be applied to a columnar storage system. The columnar storage system stores target data that is stored in a row storage form, target data that is stored in a columnar storage form, and a row storage index constructed based on the target data that is stored in a row storage form. The columnar storage system can receive a data query request and matches the data query request with the row storage index corresponding to the columnar storage system. If the matching is successful, data matched with the data query request is queried based on the row storage index. Therefore, by use of the scheme, the target data can be stored in the row storage form into the columnar storage system, and the row storage index can be constructed.

20 Claims, 5 Drawing Sheets

(56)             References Cited

U.S. PATENT DOCUMENTS

| | | | | |
|---|---|---|---|---|
| 2023/0134030 A1* | 5/2023 | Zhou | G06F 16/2477 | |
| | | | | 707/715 |
| 2023/0138283 A1* | 5/2023 | Henkes | G06F 16/221 | |
| | | | | 707/714 |
| 2023/0141891 A1* | 5/2023 | Huang | G06F 16/24539 | |
| | | | | 707/715 |
| 2025/0103572 A1* | 3/2025 | Loring | G06F 16/2219 | |

FOREIGN PATENT DOCUMENTS

| | | |
|---|---|---|
| CN | 107092624 A | 8/2017 |
| CN | 115809248 A | 3/2023 |

* cited by examiner

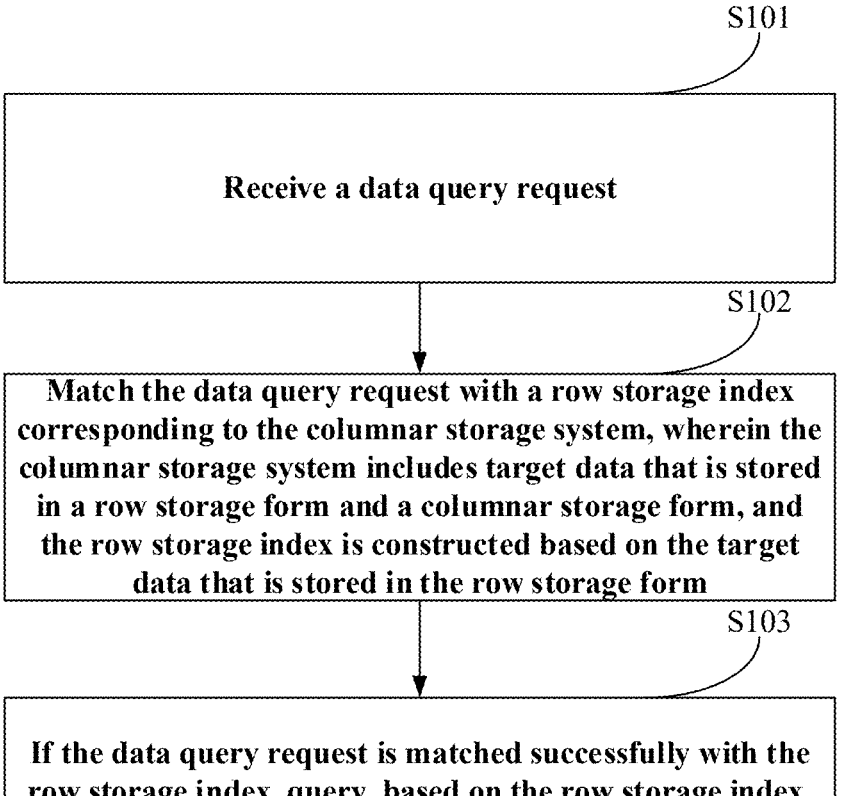

S101

Receive a data query request

S102

Match the data query request with a row storage index corresponding to the columnar storage system, wherein the columnar storage system includes target data that is stored in a row storage form and a columnar storage form, and the row storage index is constructed based on the target data that is stored in the row storage form

S103

If the data query request is matched successfully with the row storage index, query, based on the row storage index, data matched with the data query request

FIG. 2

METHOD AND APPARATUS FOR DATA QUERY

CROSS-REFERENCE TO RELATED APPLICATION(S)

This application claims priority to Chinese Application No. 202311404208.5 filed on Oct. 26, 2023, the disclosure of which is incorporated herein by reference in its entirety.

FIELD

The present application relates to the technical field of computers, and in particular, to a method and apparatus for data query.

BACKGROUND

With the development of computer technology, massive data have emerged. Correspondingly, there are more and more data storage systems configured to store and process data. The data storage system may alternatively be referred to as a data warehouse in some scenarios.

A columnar storage system is a data storage system. The columnar storage system may effectively improve the data reading efficiency in a scenario where only some columns in a table need to be read. However, in some scenarios where complete rows of data need to be queried, the columnar storage system has low data query efficiency.

Therefore, there is an urgent need for a solution that may solve the above problems.

SUMMARY

In order to solve or at least solve the above technical problems, embodiments of the present application provide a method and apparatus for data query.

According to a first aspect, the embodiments of the present application provide a data query method, applied to a columnar storage system. The method includes:

receiving a data query request;

matching the data query request with a row storage index corresponding to the columnar storage system, wherein the columnar storage system includes target data that is stored in a row storage form and a columnar storage form, and the row storage index is constructed based on the target data that is stored in the row storage form; and if the data query request is matched successfully with the row storage index, querying data matched with the data query request based on the row storage index.

Alternatively, when stored in the row storage form, the target data is stored in a key-value manner; and for any row of data in the target data, a key of the data includes three elements including a character corresponding to the key, a data writing version of the data, and a row identifier of a row which the data belongs to.

Alternatively, the columnar storage system includes a plurality of data storage nodes; the plurality of data storage nodes all include the target data that is stored in the columnar storage form; partial data storage nodes of the plurality of storage nodes include the target data that is stored in the row storage form and the row storage index; and other data storage nodes of the plurality of storage nodes, other than the partial data storage nodes do not include the target data that is stored in the row storage form and the row storage index.

Alternatively, the method further includes:

in response to determining that a query frequency of the target data is less than a preset frequency, deleting the target data that is stored in the row storage form and the row storage index.

Alternatively, the row storage index includes:

a correspondence relationship between a first data query index and a second data query index, and a correspondence relationship between the second data query index and data in the target data which corresponds to the second data query index.

Alternatively, the target data is stored into the columnar storage system by:

receiving the target data; and storing the target data into the columnar storage system respectively in the row storage form and the columnar storage form respectively.

According to a second aspect, the embodiments of the present application provide a data query apparatus, applied to a columnar storage system. The apparatus includes:

a receiving unit, configured to receive a data query request;

a matching unit, configured to match the data query request with a row storage index corresponding to the columnar storage system, wherein the columnar storage system includes target data that is stored in a row storage form and a columnar storage form, and the row storage index is constructed based on the target data that is stored in the row storage form; and a query unit, configured to if the data query request is matched successfully with the row storage index, query, based on the row storage index, data matched with the data query request.

Alternatively, when stored in the row storage form, the target data is stored in a key-value manner; and for any row of data in the target data, a key of the data includes: three elements including a character corresponding to the key, a data writing version of the data, and a row identifier of a row which the data belongs to.

Alternatively, the columnar storage system includes a plurality of data storage nodes; the plurality of data storage nodes all include the target data that is stored in the columnar storage form; partial data storage nodes among the plurality of storage nodes include the target data that is stored in the row storage form and the row storage index; and other data storage nodes among the plurality of storage nodes, other than the partial data storage nodes do not include the target data that is stored in the row storage form and the row storage index.

Alternatively, the apparatus further includes:

a deletion unit, configured to in response to determining that a query frequency of the target data is less than a preset frequency, delete the target data that is stored in the row storage form and the row storage index.

Alternatively, the row storage index includes:

a correspondence relationship between a first data query index and a second data query index, and a correspondence relationship between the second data query index and data in the target data which corresponds to the second data query index.

Alternatively, the target data is stored into the columnar storage system by receiving the target data; and storing the target data into the columnar storage system respectively in the row storage form and the columnar storage form.

In a third aspect, the embodiments of the present application provide an electronic device. The device includes a processor and a memory; and the processor is configured to execute instructions stored in the memory to cause the device to perform any method in the above first aspect.

In a fourth aspect, the embodiments of the present application provide a computer-readable storage medium, including instructions. The instructions cause a device to perform any method in the above first aspect.

In a fifth aspect, the embodiments of the present disclosure provide a computer program product. The computer program product, when run on a computer, causes the computer to perform any method in the above first aspect.

Compared with the current technology, the embodiments of the present application have the following advantages:

The embodiments of the present application provide a method for data query. The method may be applied to a columnar storage system. The columnar storage system stores target data that is stored in a row storage form, target data that is stored in a columnar storage form, and a row storage index constructed based on the target data that is stored in a row storage form. The columnar storage system may receive a data query request and matches the data query request with the row storage index corresponding to the columnar storage system. If the matching is successful, data matched with the data query request is queried based on the row storage index. Therefore, by use of the scheme, the target data may be stored in the row storage form into the columnar storage system, and the row storage index may be constructed, so that the advantage of efficient query may be achieved by using the row storage index, and the data query efficiency may be improved.

BRIEF DESCRIPTION OF THE DRAWINGS

To describe the technical solutions in the embodiments of the present application or in the related art more clearly, the following briefly introduces the accompanying drawings for describing the embodiments or the related art. Apparently, the accompanying drawings in the following description show merely some embodiments recorded in the present application, and a person of ordinary skill in the art may still derive other drawings from the accompanying drawings without creative efforts.

FIG. 2 is a flowchart of a data query method according to an embodiment of the present application;

DETAILED DESCRIPTION OF EMBODIMENTS

In order to make a person skilled in the art to better understand the solutions of the present application, the technical solutions in the embodiments of the present application are clearly and completely described below with reference to the accompanying drawings in the embodiments of the present application. Apparently, the described embodiments are merely some rather than all of the embodiments of the present application. All other embodiments obtained by a person of ordinary skill in the art based on the embodiments of the present application without making creative efforts shall fall within the protection scope of the present application.

The inventor of the present application has found that a columnar storage system is a data storage system. The columnar storage system may effectively improve the data reading efficiency in a scenario where only some columns in a table need to be read.

Figure 1:
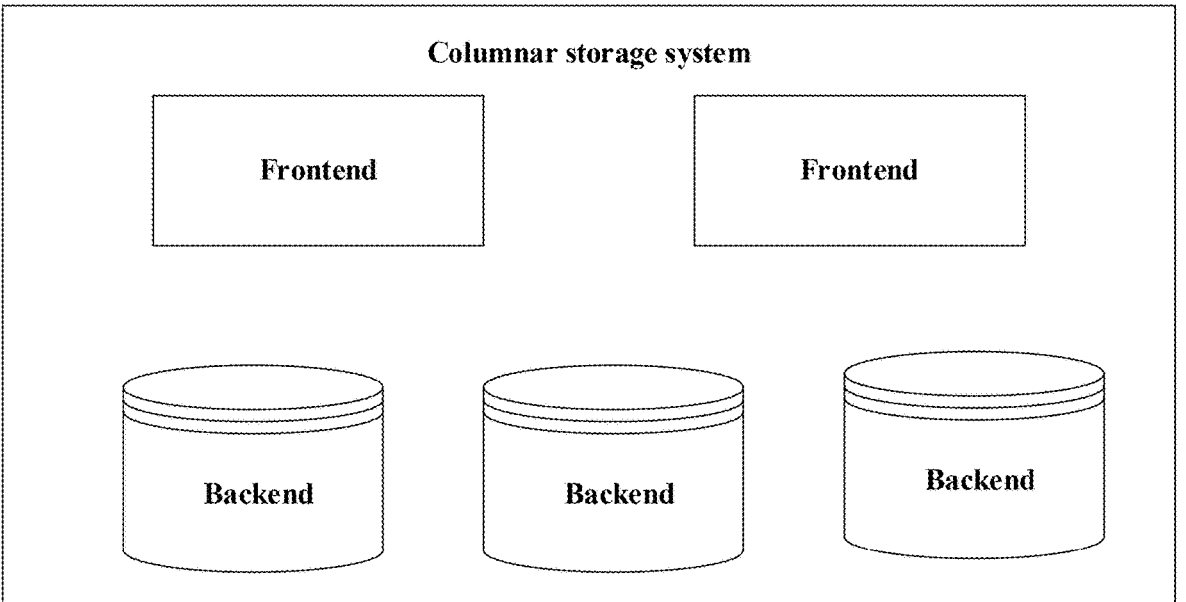
FIG. 1 is a schematic structural diagram of a columnar storage system according to an embodiment of the present application.

Referring to FIG. 1, it shows a schematic diagram of a system architecture according to an embodiment of this application.

As shown in FIG. 1, the columnar storage structure includes two frontends (FE) and three backends (BE). This is only an example. An actual number of the frontends and an actual quantity of the backends are not limited to those shown in FIG. 1.

The frontend is responsible for managing metadata, managing client connections, and conducting query planning, query scheduling, and other tasks. The backend is responsible for data storage, Structured Query Language (SQL) execution, and other tasks.

In terms of data storage, the various backends are completely equivalent, and the frontends allocate data to the corresponding backends according to a policy. During introduction of data, the data will be directly written to the backends, and the backends are responsible for writing the imported data in a corresponding format and generating a relevant index.

During execution of SQL calculation, an SQL statement is first planned into a logical execution unit according to a specific semantic, and is then split into specific physical execution units according to the distribution of the data. The physical execution units may perform execution on the specific backends for data storage. This may avoid data transmission and copying, thus achieving the ultimate query performance.

The columnar storage system exposes my Structured Query Language (MySQL) protocol interface to a client, supporting a standard SQL syntax. A user may conveniently query and analyze the data in the columnar storage system through an existing MySQL client.

However, in some scenarios where complete rows of data need to be queried, the columnar storage system has low data query efficiency. As a specific example, the columnar storage system has low data query efficiency in a high-concurrency point query scenario. A query result of point query is one or more rows of complete data that meet a query requirement. In a scenario of performing query based on an SQL statement, the point query may be understood as an SQL statement that includes one or more predicate expressions such as key=x1 or key in (x1, x2).

To solve the above problems, the embodiments of the present application provide a data query method and apparatus.

Various nonrestrictive implementations of the present application will be explained in detail below in conjunction with the accompanying drawings.
Exemplary Method Referring to FIG. 2, it is a flowchart of a data query method according to an embodiment of the present application. The data query method provided by the embodiments of the present application may be applied to a columnar storage system.

In this embodiment, the method may, for example, include the following steps: S101-S103.

S101: Receiving a data query request.

In this embodiment of the present application, the data query request may be, for example, a Structured Query Language (SQL) statement. In an example, the data query request is a query request corresponding to point query.

In an example, during specific implementation, S101 may be receiving the data query request sent by a client. The client and the columnar storage system may communicate with each other through, for example, My Structured Query Language (MySQL) protocol. When the columnar storage system uses the structure shown in FIG. 1, the frontends can receive the data query request sent by the client.

S102: matching the data query request with a row storage index corresponding to the columnar storage system, wherein the columnar storage system includes target data that is stored in a row storage form and a columnar storage form, and the row storage index is constructed based on the target data that is stored in the row storage form.

In this embodiment of the present application, to improve the data query efficiency of the columnar storage system in a scenario where complete rows of data need to be queried, for the target data, the columnar storage system may store the target data in both the row storage form and the columnar storage form. In other words, the columnar storage system at least includes two pieces of target data. One piece of target data is stored in the row storage form, and the other piece of target data is stored in the columnar storage form. Storage in the row storage form means storing complete rows of data in a table as a storage granularity, and storage in the columnar storage form means storing complete column data in a table as a storage granularity.

In this embodiment of the present application, the target data may be a smallest data management unit corresponding to the columnar storage system. For example, if the smallest data management unit corresponding to the columnar storage system includes several tables, the target data may be data carried by the tables.

In an example, the columnar storage system may store the target data in both the row storage form and the columnar storage form when receiving the target data. For example, when the columnar storage system uses the structure shown in FIG. 1, the target data may be stored in the backends. In another example, the columnar storage system may read target data that has been already stored in the columnar storage form in the columnar storage system and further store the target data in the row storage form into the columnar storage system. For example, if it is determined that the query efficiency of the target data is greater than a threshold, the columnar storage system may read target data that has been already stored in the columnar storage form in the columnar storage system and further store the target data that is stored in the row storage form into the columnar storage system.

In this embodiment of the present application, when the target data is stored in the row storage form, the target data may be stored in a key-value form. The value may be, for example, encoded into a file in a specific for storage. For example, the value may be encoded into a Sorted String Table (SST) file for storage. For any row of data in target rows, the key included in the data may be determined according to a character corresponding to the key of the data.

In an example, the key of the data may be a character corresponding to the key of the data. If the character corresponding to the key of the data is xyz, the key corresponding to the data is xyz. For example, if a first column of the target data is the key, for a first row of the target data, the value of the first column is xyz, and the key of the first row of data is xyz.

In another example, considering that for the columnar storage system, data in different data writing versions may include data having the keys corresponding to the same character. In order to distinguish the data having the keys corresponding to the same character and in different data writing versions, for a row of data in the target data, the key corresponding to the data can include two elements: the character corresponding to the key of the data and the data writing version of the data. In a specific example, if a row of data of the target data is aggregated data obtained by aggregating multiple rows of data, the key corresponding to the row of data can include two elements: a character corresponding to the key of the data and a data writing version of the data.

In another example, considering that for the same data writing version, characters corresponding to the keys of different rows of data written according to the data writing version may be the same. For example, the values of the first columns of the first and second rows of the target data are xyz. Therefore, in order to distinguish different rows of data having the keys corresponding to the same character, for a row of data, the key corresponding to the data can include two elements including a character corresponding to the key of the data and a row identifier that identifies the row to which the data belongs.

In still another example, for a row of data in the target data, the key corresponding to the data can include three elements including a character corresponding to the key of the data, a data writing version of the data, and a row identifier that identifies the row to which the data belongs.

In addition, the columnar storage system further includes a row storage index constructed according to the target data that is stored in the row storage form, so as to facilitate data query based on the row storage index in a data query stage, thereby improving the data query efficiency.

Regarding the row storage index, it may include a correspondence relationship between an index and data corresponding to the index.

In an example, the columnar storage system may create, based on a statement "CREATE INDEX index_name1 ON T (A, B) USING ROW_INDEX", a row storage index that uses a combination of column A and column B of the foregoing target data as a data query index. In this case, the row storage index may include a correspondence between a first data query index (A, B) and data corresponding to the first data query index.

In addition, a plurality of data query indexes may be created for the same smallest data management unit. For example, for the foregoing target data, a row storage index that uses a combination of column A and column B of the foregoing target data as a data query index may be created based on a statement "CREATE INDEX index_name1 ON T (A, C) USING ROW_INDEX". In this case, the row storage index may include a correspondence relationship between a second data query index (A, C) and data corresponding to the second data query index.

As mentioned earlier, in an example, when a first data query index and a second query index are created for the same smallest data management unit (such as the target data), the aforementioned row storage index may include: a correspondence relationship between a first data query index and data corresponding to the first data query index, and a correspondence relationship between a second data query index and data corresponding to the second data query index. The data corresponding to the first data query index and the data corresponding to the second data query index are the same, so that the above method may have the problem of repeated storage of the data. To avoid the repeated storage of the aforementioned data and alleviate a data storage load of the columnar storage system, during the creation of the row storage index, if a first data query index and a second query index are created for the same smallest data management unit, a correspondence relationship between the first data query index and the second data query index, as well as a correspondence relationship between the second data query index and the data in the target data corresponds to the second data query index, may be saved, so that only one copy of the data corresponding to the second data query index is stored, avoiding repeated storage.

Figure 3:
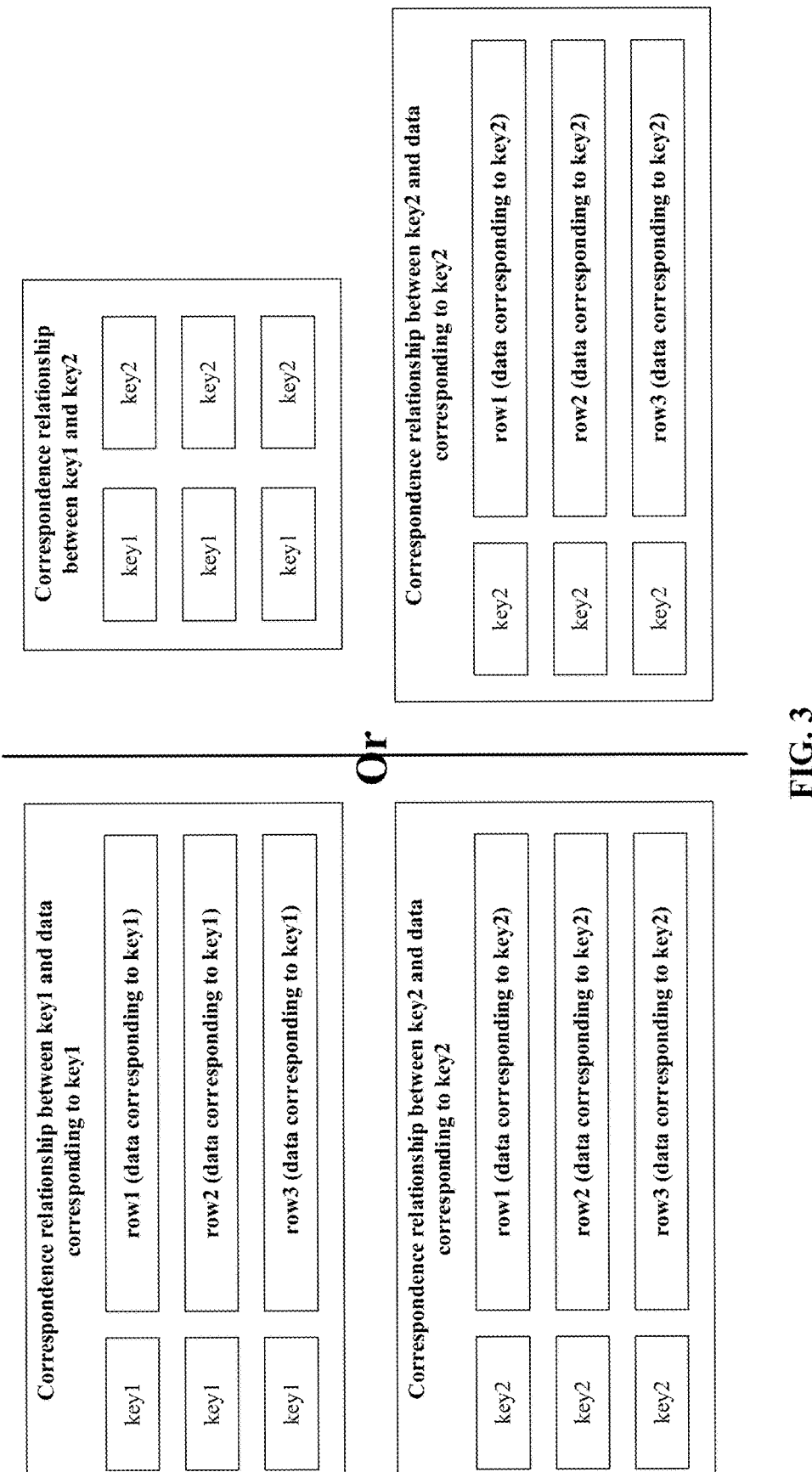
FIG. 3 is a schematic diagram of a row storage index according to an embodiment of the present application.

Referring to FIG. 3 for understanding, FIG. 3 is a schematic diagram of a row storage data index according to an embodiment of the present application. As shown in FIG. 3, assuming that the target data includes three rows, in a case that a first data query index key1 (e.g. (A, B)) and a second data query index key2 (e.g. (A, C)) are created for target data, the row storage index may include a correspondence relationship between key1 and data corresponding to key1, as well as a correspondence relationship between key2 and data corresponding to key2. In another example, a correspondence relationship between key1 and key2, as well as a correspondence relationship between key2 and data corresponding to key2 may alternatively be included. In FIG. 3, row* means complete data of a *th row in the target data.

In an implementation, the columnar storage system may include a plurality of data storage nodes. For the plurality of data storage nodes, each data storage node stores the target data that is stored in the columnar storage form. Considering that storing the target data and the aforementioned row storage index in the row storage form may consume storage resources of the columnar storage system, for the plurality of data storage nodes, the target data that is stored in the row storage form and the aforementioned row storage index may be stored into partial data storage nodes, and other data storage nodes, other than the partial data storage nodes, do not store the target data that is stored in the row storage form and the aforementioned row storage index. This effectively saves the storage resources of the columnar storage system while ensuring the data query efficiency of the columnar storage system in the point query scenario. In a specific example, one data storage node can store the target data and the aforementioned row storage index in the row storage form, and other data storage nodes do not store the target data and the aforementioned row storage index in the row storage form.

Figure 4:
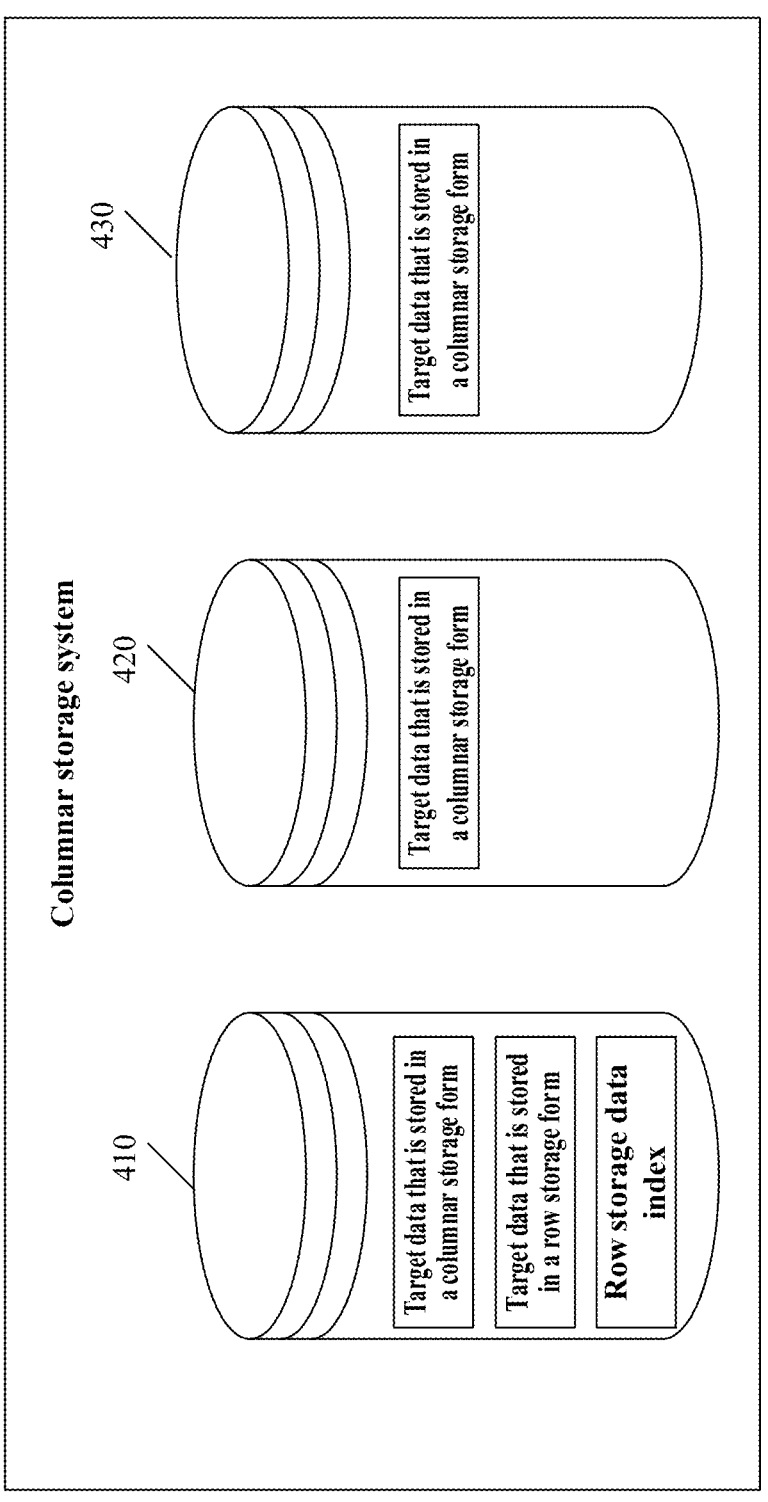
FIG. 4 is a schematic structural diagram of a columnar storage system according to an embodiment of the present application.

Referring to FIG. 4 for understanding, FIG. 4 is a schematic structural diagram of a columnar storage system according to an embodiment of the present application. As shown in FIG. 4, the columnar storage system includes three data storage nodes, namely data storage nodes 410, 420, and 430. Data storage nodes 410, 420, and 430 all store target data in a columnar storage form. Among the three data storage nodes, only data storage node 410 stores target data that is stored in a row storage form, and a row storage index. In an example, data storage nodes 410, 420, and 430 shown in FIG. 4 may correspond to the backends shown in FIG. 1.

After receiving the data query request, the data query request may be matched with the row storage index. For example, a predicate expression in the data query request may be matched with the row storage index. When the columnar storage system uses the structure shown in FIG. 1, the frontends can match the data query request with the row storage index.

S103: If the data query request is matched successfully with the row storage index, data matched with the data query request is queried based on the row storage index, If the data query request is matched successfully with the row storage index, data matched with the data query request is queried based on the row storage index. If the data query request is matched successfully with the row storage index, it can be that the predicate expression in the data query request hits a data query index (such as the foregoing first data query index or second data query index) of the row storage index. When the columnar storage system uses the structure shown in FIG. 1, the frontends may allocate the data query request to the backends storing the row storage index, and the backends query, based on the row storage index, the data matched with the data query request.

Through the above description, it can be seen that by use of the scheme, the target data can be stored in the row storage form into the columnar storage system, and the row storage index may be constructed, so that the advantage of efficient query may be achieved by using the row storage index, and the data query efficiency can be improved.

In an example, storing the target data in the row storage form and storing the aforementioned row storage index aim to improve the query efficiency of the point query performed on the target data. Storing the target data in the row form and storing the row storage index may occupy the storage resources of the columnar system. To reduce the consumption of the storage resources of the columnar storage system, the columnar storage system can further determine a query frequency of the target data. When the query frequency of the target data is small, such as less than a preset frequency, it indicates that it is not necessary to perform data query based on the row storage index. Query based on target data that is stored in a columnar storage form may meet a query requirement too. Therefore, when the query frequency of the target data is less than the preset frequency, the columnar storage system may delete the target data that is stored in the row storage form and the row storage index, thereby saving the storage resources of the columnar storage system.

In an example, if the target data is modified, for example, if some columns other than those corresponding to keys are deleted or added, a data modification type and modification fields may be recorded in metadata. During performing data query, an initial result queried using the row storage index and the metadata may be combined to process the initial result to obtain a final target result. For example, in a case that a column in the target data is deleted, the deleted column may be determined based on the metadata, and data corresponding to the column in an initial result may be deleted to obtain a target result. For another example, in a case that a column in the target data is added, the added column may be determined based on the metadata, and data corresponding to the added column may be spliced into an initial result to obtain a target result.

Exemplary Device

Based on the method provided by the above embodiment, the embodiments of the present application further provide an apparatus. The apparatus will be introduced below in conjunction with the accompanying drawings.

Figure 5:
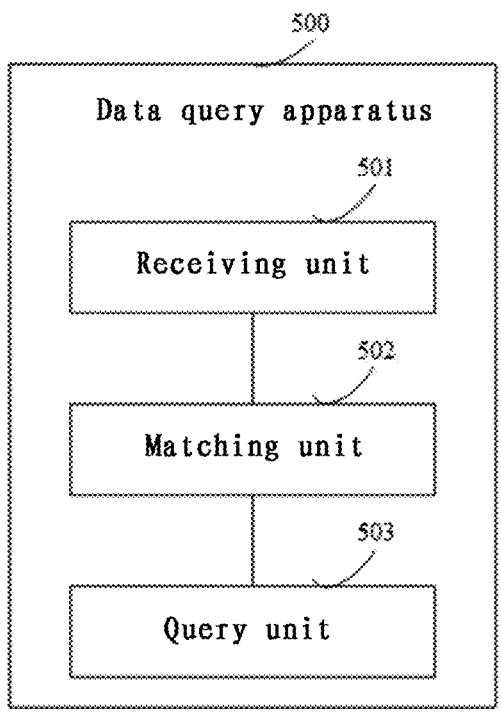
FIG. 5 is a schematic structural diagram of a data query apparatus according to an embodiment of the present application.

Referring to FIG. 5, it is a schematic structural diagram of a data query apparatus according to an embodiment of the present application. The apparatus 500 may specifically include, for example: a receiving unit 501, a matching unit 502, and a query unit 503.

The receiving unit 501 is configured to receive a data query request;

the matching unit 502 is configured to match the data query request with a row storage index corresponding to the columnar storage system, wherein the columnar storage system includes target data that is stored in a row storage form and a columnar storage form, and the row storage index is constructed based on the target data that is stored in the row storage form; and the query unit 503 is configured to if the data query request is matched successfully with the row storage index, query, based on the row storage index, data matched with the data query request.

Alternatively, when stored in the row storage form, the target data is stored in a key-value manner; and for any row of data in the target data, a key of the data includes: three elements including a character corresponding to the key, a data writing version of the data, and a row identifier of a row which the data belongs to.

Alternatively, the columnar storage system includes a plurality of data storage nodes; the plurality of data storage nodes all include the target data that is stored in the columnar storage form; partial data storage nodes among the plurality of storage nodes include the target data that is stored in the row storage form and the row storage index; and other data storage nodes among the plurality of storage nodes, other than the partial data storage nodes do not include the target data that is stored in the row storage form and the row storage index.

Alternatively, the apparatus further includes:

a deletion unit, configured to in response to determining that a query frequency of the target data is less than a preset frequency, delete the target data that is stored in the row storage form and the row storage index.

Alternatively, the row storage index includes:

a correspondence relationship between a first data query index and a second data query index, and a correspondence relationship between the second data query index and data, corresponding to the second data query index, in the target data.

Alternatively, the target data is stored into the columnar storage system by:

receiving the target data; and storing the target data into the columnar storage system respectively in the row storage form and the columnar storage form.

The apparatus 500 is an apparatus corresponding to the data query method provided by the above method embodiment. Specific implementations of all the units of the apparatus 500 belong to the same concept of the above method embodiment. Therefore, the specific implementation of all the units of the apparatus 500 may be found in the related descriptions of the above method embodiment, and will not be elaborated here.

The embodiments of the present application further provide an electronic device. The electronic device includes a processor and a memory.

The processor is configured to execute instructions stored in the memory to cause the device to perform the data query method provided by the above method embodiment.

The embodiments of the present application provide a computer-readable storage medium, including instructions. The instructions cause a device to perform the data query method provided by the above method embodiment.

The embodiments of the present disclosure provide a computer program product. The computer program product, when run on a computer, causes the computer to perform the data query method provided by the above method embodiment.

Those skilled in the art will easily come up with other implementations of the present application after considering this specification and implementing the invention disclosed here. The present application aims to cover any variations, uses, or adaptive changes of the present application, and these variations, uses, or adaptive changes follow the general principles of the present application and include common knowledge or customary technical means in the technical field that are not disclosed herein. The specification and the embodiments are considered as merely exemplary, and the scope and spirit of the present application are pointed out in the following claims.

It should be understood that the present application is not limited to the precise structures that have been described above and shown in the drawings, and various modifications and changes may be made without departing from the scope of the present application. The scope of the present application is subject only to the appended claims.

The foregoing descriptions are merely preferred embodiments of the present application, but are not intended to limit present application. Any modification, equivalent replacement, or improvement made within the spirit and principle of present application shall fall within the protection scope of present application.

We claim:

1. A data query method, being applied to a columnar storage system, wherein the method comprises:

receiving a data query request;

matching the data query request with a row storage index corresponding to the columnar storage system, wherein the columnar storage system comprises target data that is stored in a row storage form and a columnar storage form, and the row storage index is constructed based on the target data that is stored in the row storage form;

in response to the data query request matching successfully with the row storage index, querying data matched with the data query request based on the row storage index; and in response to determining that a query frequency of the target data is greater than a threshold, reading the target data that has been stored in the columnar storage form in the columnar storage system and storing the target data that is stored in the row storage form into the columnar storage system.

2. The method of claim 1, wherein in response to the target data being stored in the row storage form, the target data is stored in a key-value manner; and for any row of data in the target data, a key of the data comprises three elements including a character corresponding to the key, a data writing version of the data, and a row identifier of a row where the data belongs.

3. The method of claim 1, wherein the columnar storage system comprises a plurality of data storage nodes; the plurality of data storage nodes comprise the target data that is stored in the columnar storage form; partial data storage nodes of the plurality of storage nodes comprise the target data that is stored in the row storage form and the row storage index; and other data storage nodes of the plurality of storage nodes other than the partial data storage nodes do not comprise the target data that is stored in the row storage form and the row storage index.

4. The method of claim 1, wherein the method further comprises:

in response to determining that the query frequency of the target data is less than a preset frequency, deleting the target data that is stored in the row storage form and the row storage index.

5. The method of claim 1, wherein the row storage index comprises:

a correspondence relationship between a first data query index and a second data query index, and a correspondence relationship between the second data query index and data in the target data corresponding to the second data query index.

6. The method of claim 1, wherein the target data is stored into the columnar storage system by:

receiving the target data; and storing the target data into the columnar storage system respectively in the row storage form and the columnar storage form.

7. An electronic device, wherein the device comprises a processor and a memory; and the processor is configured to execute instructions stored in the memory to cause the device to:

receive a data query request;

match the data query request with a row storage index corresponding to a columnar storage system, wherein the columnar storage system comprises target data that is stored in a row storage form and a columnar storage form, and the row storage index is constructed based on the target data that is stored in the row storage form;

in response to the data query request matching successfully with the row storage index, query data matched with the data query request based on the row storage index; and in response to determining that a query frequency of the target data is greater than a threshold, read the target data that has been stored in the columnar storage form in the columnar storage system and store the target data that is stored in the row storage form into the columnar storage system.

8. The electronic device of claim 7, wherein in response to the target data being stored in the row storage form, the target data is stored in a key-value manner; and for any row of data in the target data, a key of the data comprises three elements including a character corresponding to the key, a data writing version of the data, and a row identifier of a row where the data belongs.

9. The electronic device of claim 7, wherein the columnar storage system comprises a plurality of data storage nodes; the plurality of data storage nodes comprise the target data that is stored in the columnar storage form; partial data storage nodes of the plurality of storage nodes comprise the target data that is stored in the row storage form and the row storage index; and other data storage nodes of the plurality of storage nodes other than the partial data storage nodes do not comprise the target data that is stored in the row storage form and the row storage index.

10. The electronic device of claim 7, wherein the electronic device is further caused to:

in response to determining that the query frequency of the target data is less than a preset frequency, delete the target data that is stored in the row storage form and the row storage index.

11. The electronic device of claim 7, wherein the row storage index comprises:

a correspondence relationship between a first data query index and a second data query index, and a correspondence relationship between the second data query index and data in the target data corresponding to the second data query index.

12. The electronic device of claim 7, wherein the target data is stored into the columnar storage system by:

receiving the target data; and storing the target data into the columnar storage system respectively in the row storage form and the columnar storage form.

13. A non-transitory computer-readable storage medium, comprising instructions, wherein the instructions cause a device to:

receive a data query request;

match the data query request with a row storage index corresponding to a columnar storage system, wherein the columnar storage system comprises target data that is stored in a row storage form and a columnar storage form, and the row storage index is constructed based on the target data that is stored in the row storage form;

in response to the data query request matching successfully with the row storage index, query data matched with the data query request based on the row storage index; and in response to determining that a query frequency of the target data is greater than a threshold, read the target data that has been stored in the columnar storage form in the columnar storage system and store the target data that is stored in the row storage form into the columnar storage system.

14. The non-transitory computer-readable storage medium of claim 13, wherein in response to the target data being stored in the row storage form, the target data is stored in a key-value manner.

15. The non-transitory computer-readable storage medium of claim 14, wherein for any row of data in the target data, a key of the data comprises three elements including a character corresponding to the key, a data writing version of the data, and a row identifier of a row where the data belongs.

16. The non-transitory computer-readable storage medium of claim 13, wherein the columnar storage system comprises a plurality of data storage nodes; the plurality of data storage nodes comprise the target data that is stored in the columnar storage form; partial data storage nodes of the plurality of storage nodes comprise the target data that is stored in the row storage form and the row storage index; and other data storage nodes of the plurality of storage nodes other than the partial data storage nodes do not comprise the target data that is stored in the row storage form and the row storage index.

17. The non-transitory computer-readable storage medium of claim 13, wherein the device is further caused to:

in response to determining that the query frequency of the target data is less than a preset frequency, delete the target data that is stored in the row storage form and the row storage index.

18. The non-transitory computer-readable storage medium of claim 13, wherein the row storage index comprises a correspondence relationship between a first data query index and a second data query index.

19. The non-transitory computer-readable storage medium of claim 18, wherein the row storage index comprises a correspondence relationship between the second data query index and data in the target data corresponding to the second data query index.

20. The non-transitory computer-readable storage medium of claim 13, wherein the target data is stored into the columnar storage system by:

receiving the target data; and storing the target data into the columnar storage system respectively in the row storage form and the columnar storage form.

\* \* \* \* \*